US007242344B2

(12) United States Patent
Mitsumoto

(10) Patent No.: US 7,242,344 B2
(45) Date of Patent: Jul. 10, 2007

(54) RADAR APPARATUS AND RADAR SIGNAL PROCESSING METHOD

(75) Inventor: Masashi Mitsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 149 days.

(21) Appl. No.: 11/201,182

(22) Filed: Aug. 11, 2005

(65) Prior Publication Data

US 2006/0214839 A1 Sep. 28, 2006

(30) Foreign Application Priority Data

Mar. 24, 2005 (JP) ............................ 2005-086171

(51) Int. Cl.
*G01S 13/42* (2006.01)
(52) U.S. Cl. .................. 342/70; 342/109; 342/128; 342/145; 342/189; 342/195
(58) Field of Classification Search ............ 342/70–72, 342/107–112, 115–117, 128–137, 145, 189, 342/195
See application file for complete search history.

(56) References Cited

U.S. PATENT DOCUMENTS

| | | | | |
|---|---|---|---|---|
| 5,457,462 A | * | 10/1995 | Mitsumoto et al. | 342/93 |
| 5,563,602 A | * | 10/1996 | Stove | 342/70 |
| 5,619,208 A | * | 4/1997 | Tamatsu et al. | 342/70 |
| 5,963,162 A | * | 10/1999 | Mochizuki et al. | 342/70 |
| 6,018,309 A | * | 1/2000 | Mitsumoto et al. | 342/109 |
| 6,384,769 B1 | * | 5/2002 | Mitsumoto et al. | 342/109 |
| 6,611,225 B2 | * | 8/2003 | Mitsumoto et al. | 342/70 |
| 6,788,247 B2 | * | 9/2004 | Mitsumoto et al. | 342/109 |
| 2003/0142009 A1 | * | 7/2003 | Mitsumoto et al. | 342/109 |
| 2004/0125010 A1 | * | 7/2004 | Natsume et al. | 342/70 |
| 2006/0214839 A1 | * | 9/2006 | Mitsumoto | 342/70 |
| 2007/0008210 A1 | * | 1/2007 | Kibayashi et al. | 342/70 |

FOREIGN PATENT DOCUMENTS

| | | | |
|---|---|---|---|
| JP | 61235779 A | * | 10/1986 |
| JP | 05180933 A | * | 7/1993 |
| JP | 11-271429 A | | 10/1999 |

* cited by examiner

*Primary Examiner*—John B. Sotomayor
(74) *Attorney, Agent, or Firm*—Sughrue Mion, PLLC

(57) ABSTRACT

A radar apparatus calculates distances or relative speeds of a target according to a plurality of formulae. An predicted distance calculation formula is obtained at the following observation from the distances or the relative speeds thus calculated. A determination is made as to whether the distance calculation formula at the current observation is equal to the predicted distance calculation formula, and only when they are equal to each other, the result of the calculation is output. A distance, a relative speed and a distance calculation formula at the following observation are calculated, and a determination is made as to whether there is a correlation between the result at the current observation and the result of the prediction section. Only the result of the calculation at the current time point is output in the presence of a correlation.

6 Claims, 4 Drawing Sheets

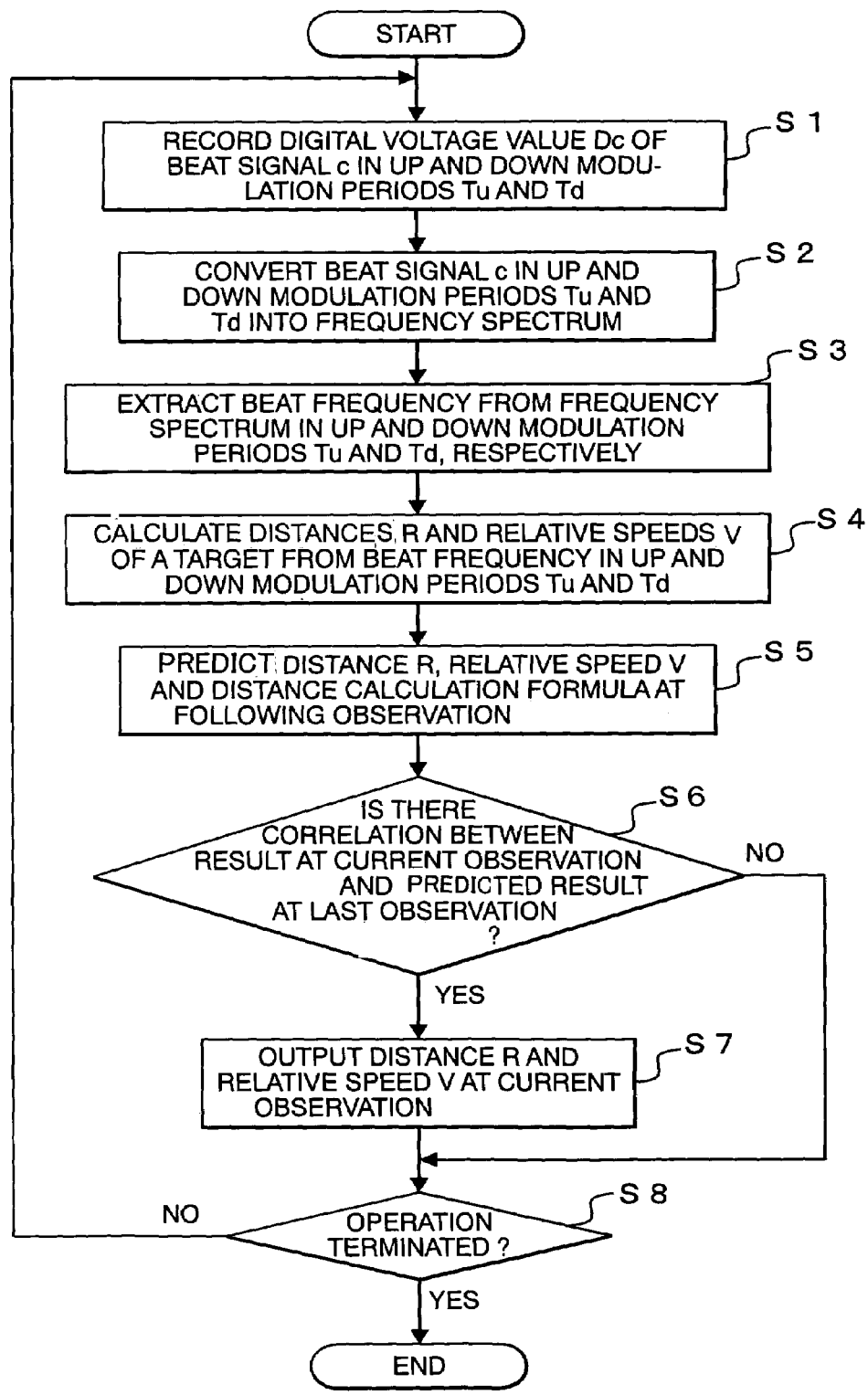

RADAR APPARATUS AND RADAR SIGNAL PROCESSING METHOD

BACKGROUND OF THE INVENTION

1. Field of the Invention

The present invention relates to a radar apparatus adapted to be installed on a movable object such as, for instance, a vehicle, and more specifically, to a radar apparatus and a radar signal processing method for measuring the distance and the relative speed of an object to be detected (hereinafter referred to as a "target") by detecting the target.

2. Description of the Related Art

In general, in such a kind of radar apparatus installed on a movable object such as a vehicle, the detection range of a target is from about a few meters to about several hundreds of meters, so the distance and speed of the target is measured by an FMCW (Frequency Modulated Continuous Wave) method.

According to a known radar apparatus and a known radar signal processing method therefor, the distance R and the relative speed V of a target are calculated according to the following expressions (1) and (2) by using, as a transmitted signal, a continuous wave (FMCW) signal including an up modulation period in which the frequency thereof becomes higher with the lapse of time, and a down modulation period in which the frequency becomes lower with the lapse of time (see, for instance, a first patent document: Japanese patent application laid-open No. H11-271429).

$$R=(fU+fD)/(2\times Kr) \quad (1)$$

$$V=(fU-fD)/(2\times Kv) \quad (2)$$

where fU represents a beat frequency observed in the up modulation period; fD represents a beat frequency observed in the down modulation period; Kr represents a conversion factor for conversion from distance to frequency; and Kv represents a conversion factor for conversion from relative speed to frequency.

Here, note that in the above-mentioned first patent document, in order to improve target detection performance, the distance R and the relative speed V of the target at the following observation are predicted from those which were calculated at a certain observation (e.g., current observation), and the beat frequencies fU, fD at the following observation are predicted based on the above expressions (1) and (2). Among a plurality of beat frequencies fU, fD obtained at the following observation, a pair of those values which are the nearest to the predicted values are selected so that the distance R and the relative speed V of the target are calculated based on the values thus selected.

In the known radar apparatus and the radar signal processing method, according to the principle of the FMCW type or system, the distance R and the relative speed V of the target are not necessarily calculated from the above expressions (1) and (2) because of a magnitude correlation for the distance R and the relative speed V, and hence there arises a problem that particularly in case where the calculated values of the distance R and the relative speed V are approximate with each other, confusion can be made between the distance R and the relative speed V.

SUMMARY OF THE INVENTION

Accordingly, the present invention is intended to obviate the problem as referred to above, and has for its object to provide a radar apparatus and a radar signal processing method in which from distances and relative speeds calculated at a certain observation, there are obtained predicted distance calculation formulae at the following observation, so that at the following observation, by selecting the result of the distance calculated according to the same formula as one of the predicted distance calculation formulae, it is possible to accurately detect a target without any confusion between the distance and the relative speed thereof regardless of a magnitude correlation between the distance and the relative speed.

Bearing the above object in mind, according to the present invention, there is provided a radar apparatus in which a transmission wave based on a frequency modulated transmitted signal comprising an up modulation period and a down modulation period is irradiated onto a target, and a reflected wave from the target is received as a received signal, so that the target is detected by observing a beat signal generated by mixing the transmitted signal and the received signal, thereby measuring a distance or a relative speed to the target. The radar apparatus includes: a distance and speed calculation section that calculates, as candidates for one target at the current observation, distances or relative speeds with respect to the one target by using a plurality of formulae; an prediction section that obtains an predicted distance calculation formula at the following observation from the distances or relative speeds calculated at the current observation; a correlation determination section that determines whether the distance calculation formula at the current observation is equal to the predicted distance calculation formula at the current observation predicted from the last observation; and a target selection section that outputs the calculation result of the distance and speed calculation section only when the prediction distance calculation formula at the current observation is equal to the predicted distance calculation formula predicted from the last observation.

According to the present invention, the target can be accurately detected without causing any confusion between the distance and the relative speed thereof regardless of a magnitude correlation between the distance and the relative speed.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 4 is a flow chart illustrating a signal processing procedure according to the embodiment of the present invention.

DESCRIPTION OF THE PREFERRED EMBODIMENT

Hereinafter, a preferred embodiment of the present invention will be described while referring to the accompanying drawings.

Embodiment 1

Figure 1:
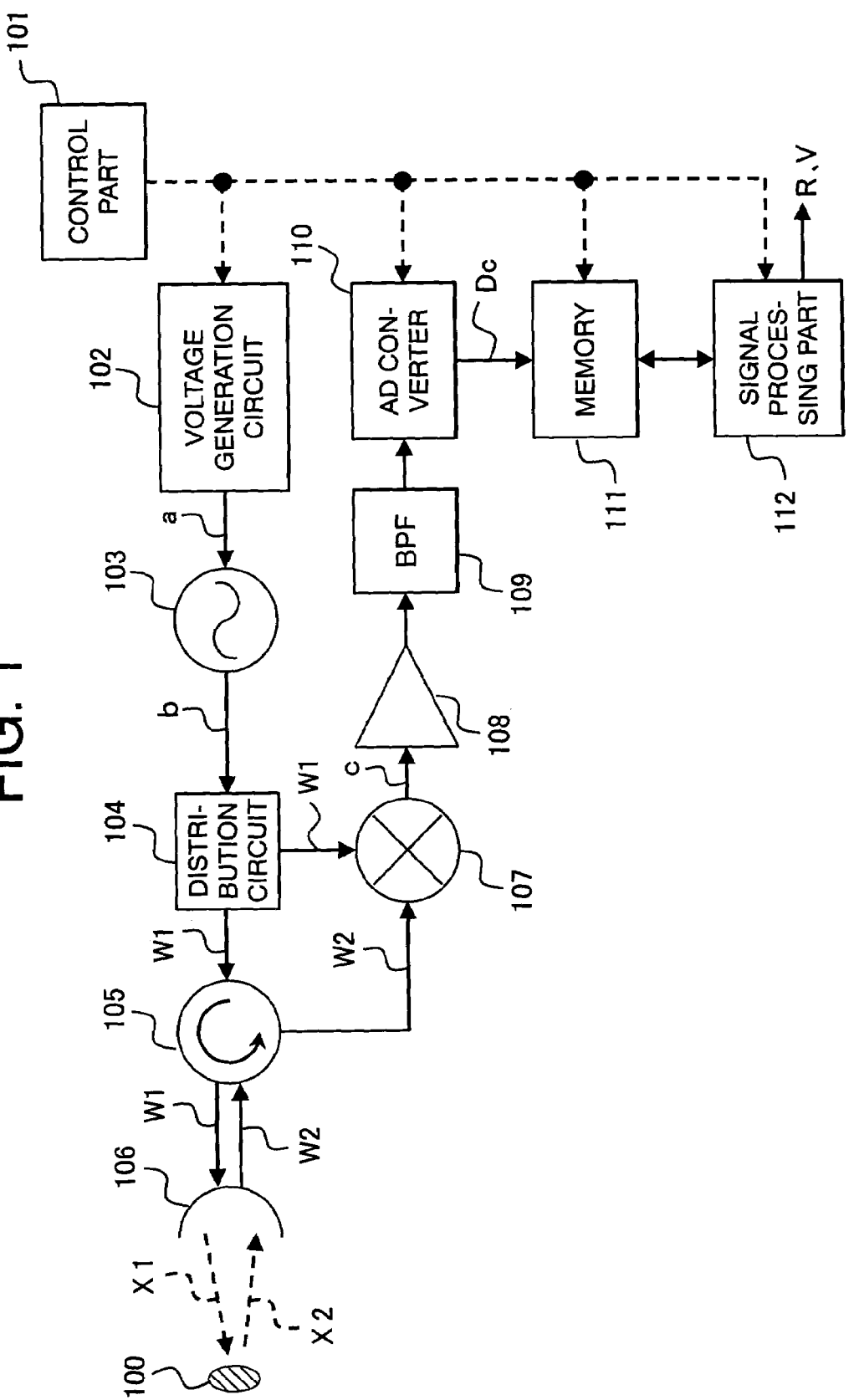
FIG. 1 is a block diagram showing the construction of a radar apparatus according to one embodiment of the present invention.

FIG. 1 is a block diagram that illustrates a radar apparatus according to one embodiment of the present invention.

In FIG. 1, the radar apparatus for detecting a target 100 includes a control part 101, a voltage generation circuit 102, a voltage controlled oscillator (VCO) 103, a distribution circuit 104, a circulator 105, an antenna 106 for transmission and reception, a mixer 107, an amplifier 108, a band-pass filter (BPF) 109, an AD (Analog to Digital) converter 110, a memory 111, and a signal processing part 112.

The voltage generation circuit 102 generates a control voltage a under the control of the control part 101, and the VCO 103 outputs an FMCW signal b which includes an up modulation period Tu and a down modulation period Td and is frequency modulated in accordance with the control voltage a.

The distribution circuit 104 distributes a transmitted signal W1 based on the FMCW signal b from the VCO 103 to the circulator 105 and the mixer 107. The circulator 105 sends the transmitted signal W1 to the antenna 106 at the time of transmission thereof, and inputs a received signal W2 received from the antenna 106 to the mixer 107 at the time of reception thereof.

The antenna 106 irradiates a transmission wave X1 based on the transmitted signal W1 from the circulator 105 to the target 100, and receives a reflected wave X2 from the target 100 as the received signal W2. The received signal W2 is input through the circulator 105 to the mixer 107 where it is mixed with the transmitted signal W1 (local signal).

The mixer 107 mixes the transmitted signal W1 and the received signal W2 with each other to generate a beat signal c that has a beat frequency fc corresponding to the up modulation period Tu and the down modulation period Td. The beat signal c is input to the signal processing part 112 through the amplifier 108, the BPF 109, the AD converter 110, and the memory 111.

The signal processing part 112 observes or monitors the beat signal c to detect the target 100 so that it measures the distance R or the relative speed V with respect to the target 100 and outputs the result of the measurement to an external device (a motion controller for a movable object, a display device, etc.). The signal processing part 112 is constituted by a CPU (central processing unit) or a combination of a CPU and a DSP (digital signal processor), and includes a distance and speed calculation section, an prediction section, a correlation determination section, and a target selection section, as will be described later. In the signal processing part 112, the distance and speed calculation section calculates, as candidates for one target 100 at the current observation, distances R or relative speeds V with respect to the one target 100 by using a plurality of formulae.

The prediction section obtains an predicted distance calculation formula at the following observation from the distances R or the relative speeds V calculated at the current observation. The correlation determination section determines whether a distance calculation formula at the current observation is equal or identical to the predicted distance calculation formula at the current observation predicted from the last observation. The target selection section outputs the result of the calculation (the distance R and the relative speed V) of the distance and speed calculation section only when the distance calculation formula at the current observation is equal or identical to the predicted distance calculation formula predicted from the last observation.

Next, reference will be made to the operation of the embodiment of the present invention as shown in FIG. 1, while referring to FIG. 2.

Figure 2:
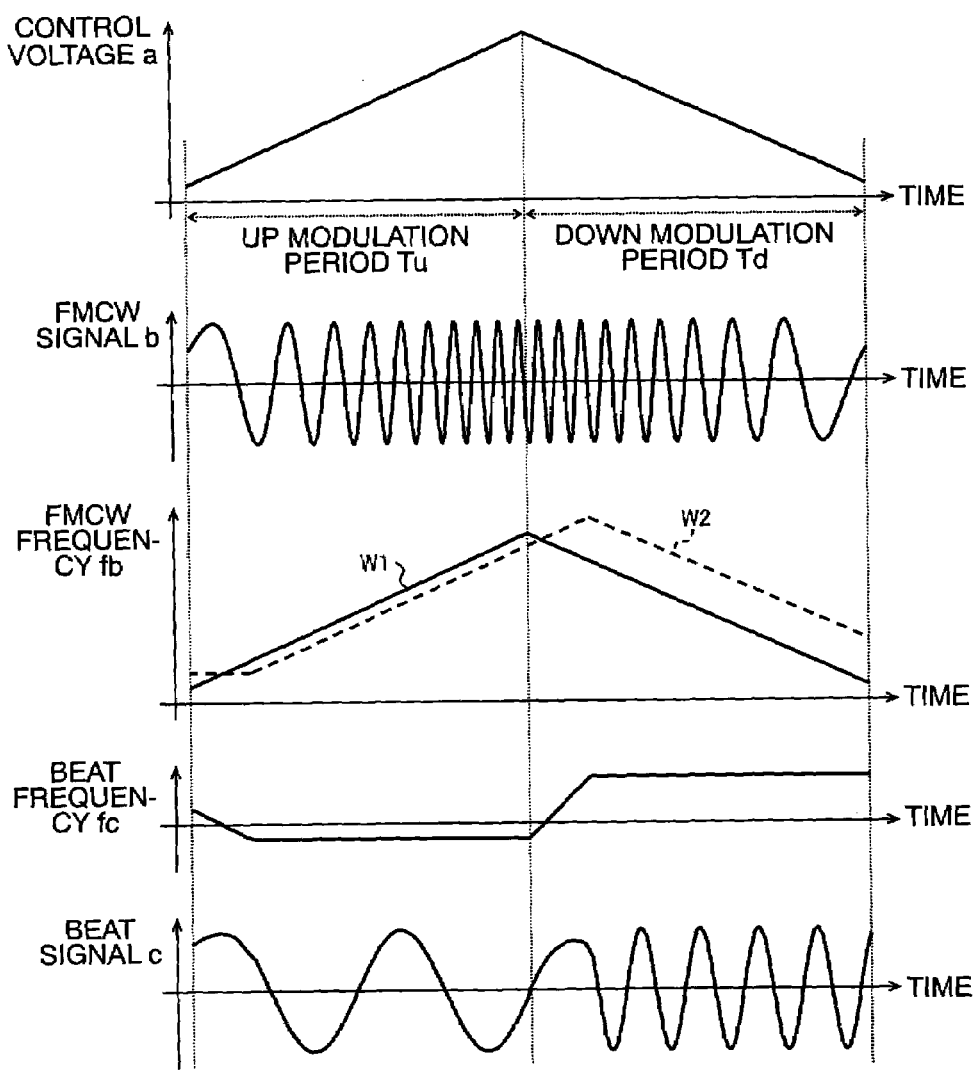
FIG. 2 is a waveform diagram showing the changes over time of the voltages and the frequencies of respective signals in FIG. 1.

FIG. 2 is an explanatory view that illustrates the voltage waveforms and the frequency waveforms of the respective signals in FIG. 1.

In FIG. 2, first of all, the voltage generation circuit 102 is controlled in its operation timing by means of the control part 101, so that it generates a time-varying control voltage a including an up modulation period Tu and a down modulation period Td and changing like a triangular wave over time, and impresses it to the VCO 103. The VCO 103 generates an FMCW signal b comprising a frequency modulation continuous wave (FMCW) whose frequency changes over time in accordance with the control voltage a impressed thereto, and inputs it to the distribution circuit 104. The distribution circuit 104 distributes the FMCW signal b from the VCO 103 as a transmitted signal W1 to the circulator 105 and the mixer 107.

The time variance of the frequency fb of the FMCW signal b becomes like a waveform corresponding to the up modulation period Tu and the down modulation period Td, as indicated by a solid line (corresponding to the transmitted signal W1) in FIG. 2.

The distribution circuit 104 sends a part of the FMCW signal b input from the VCO 103 to the antenna 106 through the circulator 105 as a transmitted signal W1, and also sends the remainder of the FMCW signal b (the transmitted signal W1) to the mixer 107 as a local signal. The antenna 106 radiates the transmitted signal W1 thus input through the circulator 105 as a transmission radio wave X1. At this time, if there exists a radio wave reflector such as a target 100, etc., in the direction in which the transmission wave X1 is radiated, a part of the radiated transmission wave X1 is reflected by the target 100 or the like as a reflected wave X2, and reaches the antenna 106 again while propagating through space, so that it is received as a received signal W2, as indicated by a broken line in FIG. 2. The received signal W2 received by the antenna 106 is input to the mixer 107 through the circulator 105. The mixer 107 mixes the received signal W2 (see the broken line in FIG. 2) and the local signal of the transmitted signal W1 (see the solid line in FIG. 2) from the distribution circuit 104 with each other to generate a beat signal c. The frequency change of the beat signal c with respect to time is shown as a beat frequency fc in FIG. 2. The beat signal c generated by the mixer 107 is amplified by the amplifier 108, and then input to the AD converter 110 after unnecessary frequency components have been removed therefrom by means of the BPF 109.

The AD converter 110 takes in the beat signal c under the control of the control part 101 in synchronization with the observation periods of both the up modulation period Tu and the down modulation period Td of the control voltage a, converts it into a digital voltage value Dc and inputs it to the memory 111. The memory 111 comes into a writable state under the control of the control part 101 in synchronization with the observation periods of both the up modulation period Tu and the down modulation period Td of the control voltage a, so that the digital voltage value Dc of the beat signal c input from the AD converter 110 is written or recorded therein. Also, the memory 111 comes into a state in which the digital voltage value Dc thus recorded can be read out therefrom when the observation periods of both the up modulation period Tu and the down modulation period Td of the control voltage a are terminated under the control of the control part 101. At the time when the observation periods of both of the up phase modulation period tu and the down modulation period td are terminated, the signal processing part 112 takes in a digital voltage value Dcu of the beat signal c in the up modulation and a digital voltage value Dcd of the beat signal c in the down modulation under the control of the control part 101, calculates the distance R and the relative speed V of the target 100 and outputs the calculation result to the external device.

Figure 3:
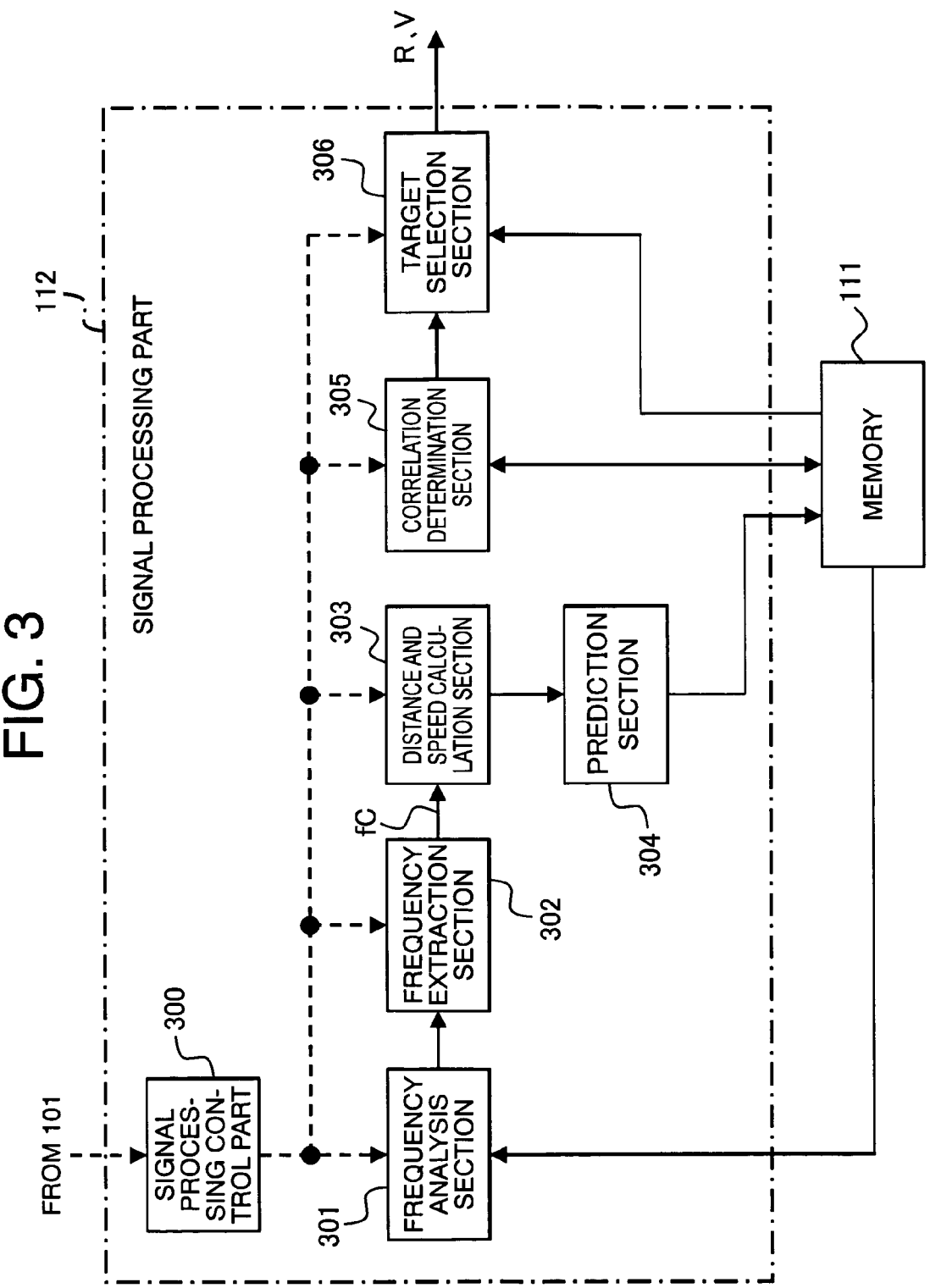
FIG. 3 is a block diagram specifically showing the functional configuration of a signal processing part in FIG. 1.

Next, the functional configuration of the signal processing part 112 in FIG. 1 will be specifically described while referring to FIG. 3.

FIG. 3 is a block diagram that illustrates the functional configuration of the signal processing part 112. In FIG. 3, the signal processing part 112 is provided with a signal processing control part 300 that functions under the control of the control part 101, a frequency analysis section 301, a frequency extraction section 302, a distance and speed calculation section 303, an prediction section 304, a correlation determination section 305, and a target selection section 306, all of these sections 301 through 306 being controlled through the signal processing control part 300.

The frequency analysis section 301 reads out the digital voltage value Dc in the memory 111 and analyzes the frequency. The frequency extraction section 302 extracts the beat frequency fc based on the result of the analysis of the frequency analysis section 301. The distance and speed calculation section 303 calculates the distance R or the relative speed V and inputs it to the prediction section 304. The prediction section 304 inputs an predicted result (a distance calculation formula) at the following observation obtained based on the current calculation result (the distance R, the relative speed V) to the memory 111. The correlation determination section 305 determines whether the distance calculation formula obtained at the current observation is equal to the predicted distance calculation formula at the current observation predicted from the last observation. The target selection section 306 selects a target 100, which becomes an object to be detected, from the determination result of the correlation determination section 305 and the contents of the memory 111.

Next, reference will be made to the operation of the signal processing part 112 illustrated in FIG. 3 according to the embodiment of the present invention, while referring to the flow chart of FIG. 4 together with FIGS. 1 and 2.

First of all, the control part 101 records the digital voltage value Dc of the beat signal c into the memory 111 in the up modulation period Tu, and also records the digital voltage value Dc of the beat signal c into the memory 111 in the down modulation period Td (step S1).

Subsequently, at the time when the recording processing of the beat signal c in step S1 is terminated, the signal processing control part 300 starts overall control in the signal processing part 112 under the control of the control part 101. First of all, the frequency analysis section 301 reads out the digital voltage value Dc of the beat signal from the memory 111 and converts it into a corresponding frequency spectrum under the control of the signal processing control part 300 (step S2). At this time, the frequency spectrum of the beat signal c in the up modulation period Tu and the frequency spectrum of the beat signal c in the down modulation period Td are acquired, for example, according to processing of Fourier transform (FFT: Fast Fourier Transform), etc.

Thereafter, the frequency extraction section 302 extracts, from the frequency spectrum acquired in step S2, a beat frequency fc, which appears corresponding to the target 100, for instance, by performing maximum peak detection with respect to spectrum amplitude values that are greater than a current threshold value under the control of the signal processing control part 300, and inputs it to the distance and speed calculation section 303 (step S3). That is, in steps S2 and S3, a beat frequency fU (i) {i=from 1 to I inclusive} of the up modulation period Tu corresponding to the target 100, and a beat frequency fD (j) {j=from 1 to J inclusive} of the down modulation period Td corresponding to the target 100 are input from the frequency analysis section 301 to the distance and speed calculation section 303 through the frequency extraction section 302.

Here, target candidate data sets used in the prediction section 304, the correlation determination section 305 and the target selection section 306 will be described. A target candidate data set includes, as data elements, a distance Ro (k), a relative speed Vo (k) and a distance calculation formula Eo (k) at a certain observation k, and an predicted distance R1 (k), an predicted relative speed V1 (k) and an prediction distance calculation formula E1 (k) at the following observation (k+1) predicted from a detection determination flag D (k) and a distance R (k) and a relative speed V (k). In addition, there exist a plurality of target candidate data sets, and for instance, an n-th target candidate data set TCDS (k)[n] is represented as the following expression, and kept in the memory 111.

$$TCDS(k)[n]=\{Ro(k)[n], Vo(k)[n], Eo(k)[n], D(k)[n], R1(k)[n], V1(k)[n], E1(k)[n]\}$$

where n=from 1 to N inclusive.

Next, the measuring principle of the distance R and the relative speed V in the radar apparatus of the FMCW type will be described. Here, note that in the following description, the relative speed V is defined as representing a negative value (<0) when the radar apparatus is approaching the target T or vice versa.

In the radar apparatus of the FMCW type, the beat frequency fu in the up modulation period Tu and the beat frequency fd in the down modulation period Td with respect to the target 100 of the distance R and the relative speed V are represented according to the following expressions (3) and (4), respectively, by using a conversion factor Kr for conversion from distance to frequency and a conversion factor Kv for conversion from speed to frequency.

$$fu=-Kr \times R-Kv \times V \qquad (3)$$

$$fd=Kr \times R-Kv \times V \qquad (4)$$

Here, note that the above expressions (3) and (4) hold in case where the beat signal c is observed as a complex signal.

Accordingly, in order for the above expressions (3) and (4) to hold, it is necessary to generate and record both signals, one corresponding to the imaginary part of the complex signal, and the other corresponding to the real part of the complex signal, and to this end, a receiving circuit of two systems for dealing with both of these signals is needed. However, in radar apparatuses which are mounted on vehicles requiring reduction in size of their component parts, there are many cases where a receiving circuit of one system is used to generate and record only a signal corresponding to the real part of a complex signal. In this case, with respect to the target 100 of the distance R and the relative speed V, the beat frequency fU in the up modulation period Tu and the beat frequency fD in the down modulation period Td are represented by the following expressions (5) and (6), respectively.

$$fU=|fu|=|-Kr \times R-Kv \times V| \qquad (5)$$

$$fD=|fD|=|Kr \times R-Kv \times V| \qquad (6)$$

where Kr>0, R>0, and Kv>0.

In addition, if the relation between the beat frequencies fU and fD in the up and down modulation periods Tu and Td is fU>fD, the relative speed V becomes greater than zero (V>0), whereas if fU<fD, V becomes less than zero (V<0). Accordingly, the above expressions (1) and (2) hold in case of (Kr×R)>|Kv×V|, whereas the following expressions (7), (8a) and (8b) hold in case of (Kr×R)<|Kv×V|.

$$R = |fU - fD|/(2 \times Kr) \quad (7)$$

$$V = (fU + fD)/(2 \times Kv) \text{(in case of } fU > fD) \quad (8a)$$

$$V = -(fU + fD)/(2 \times Kv) \text{(in case of } fU < fD) \quad (8b)$$

That is, there exist the following two cases depending on the magnitude correlation between the value of (Kr×R) and the value of |Kv×V|: one case is that the distance R and the relative speed V are calculated according to the above expressions (1) and (2); and the other case is that the distance R and the relative speed V is calculated according to the above expressions (7), (8a) and (8b). In view of the above characteristics, the distance and speed calculation section 303 in the signal processing part 112 calculates the distance and the relative speed of the target from the beat frequency fc input from the frequency extraction section 302 under the control of the signal processing control part 300, and inputs them to the prediction section 304 (step S4). Specifically, in step S4, based on the beat frequencies fU (i) {i=from 1 to I inclusive} and fD (j) {j=from 1 to J inclusive} in the up and down modulation periods Tu and Td, the distance and speed calculation section 303 calculates, as the distance at the current observation k, a distance Radd (k) according to the above expression (1), also calculates, as the relative speed at the current observation k, a relative speed Vsub (k) according to the above expression (2), and inputs them to the prediction section 304 so as to perform an prediction calculation at the following observation. In step S4, the distance and speed calculation section 303 calculates a distance Rsub (k) according to the above expression (7) as the distance at the current observation k, also calculates a relative speed Vadd (k) according to the above expression (8a) or (8b) as the relative speed at the current observation k, and inputs them to the prediction section 304.

Using a well-known prediction filter technique (an α–β filter, a Karman filter, etc.), the prediction section 304 calculates the predicted distance R1add (k) and the predicted relative speed V1sub (k) at the following observation (k+1) from the distance Radd (k) and the relative speed Vsub (k) at the current observation k calculated by the distance and speed calculation section 303 under the control of the signal processing control part 300. Further, the prediction section 304 predicts, from the magnitude correlation of the value of Kr×R1add (k) and the value of |Kv×V1sub (k)|, whether the distance calculation formula at the following observation (k+1) is identical with the above expression (1) or the above expression (7) (step S5).

The data represented by the following expressions (9) through (13), (14a) and (14b), that is, the distance Radd (k), the relative speed Vsub (k), the distance calculation formula (to be added), the predicted distance R1add (k), the predicted relative speed V1sub (k), and the prediction distance calculation formula (to be added or subtracted), are added to target candidate data sets.

$$Ro(k)[n] = Radd(k) \quad (9)$$

$$Vo(k)[n] = Vsub(k) \quad (10)$$

$$Eo(k)[n] = \text{add} \quad (11)$$

$$R1(k)[n] = R1add(k) \quad (12)$$

$$V1(k)[n] = V1sub(k) \quad (13)$$

$$E1(k)[n] = \text{add (in case of the distance calculation formula being predicted as expression (1) above)} \quad (14a)$$

$$E1(k)[n] = \text{sub (in case of the distance calculation formula being predicted as expression (7) above)} \quad (14b)$$

In addition, the prediction section 304 calculates the predicted distance R1sub (k) and the predicted relative speed V1add (k) at the following observation (k+1) from the distance Rsub (k) and the relative speed Vadd (k) at the current observation k calculated by the distance and speed calculation section 303 under the control of the signal processing control part 300, as in the case of the predicted distance R1add (k) and the predicted relative speed V1sub (k). Further, the prediction section 304 predicts, from the magnitude correlation of the value of Kr×R1sub (k) and the value of |Kv×V1add (k)|, whether the distance calculation formula at the following observation (k+1) is identical with the above expression (1) or the above expression (7).

The data represented by the following expressions (15) through (19), (20a) and (20b), that is, the distance Rsub (k), the relative speed Vadd (k), the distance calculation formula (to be subtracted), the predicted distance R1sub (k), the predicted relative speed V1add (k), and the prediction distance calculation formula (to be added or subtracted), are added to the target candidate data sets.

$$Ro(k)[n+1] = Rsub(k) \quad (15)$$

$$Vo(k)[n+1] = Vadd(k) \quad (16)$$

$$Eo(k)[n+1] = \text{sub} \quad (17)$$

$$R1(k)[n+1] = R1sub(k) \quad (18)$$

$$V1(k)[n+1] = V1add(k) \quad (19)$$

$$E1(k)[n+1] = \text{add (in case of the distance calculation formula being predicted as expression (1) above)} \quad (20a)$$

$$E1(k)[n+1] = \text{sub (in case of the distance calculation formula being predicted as expression (7) above)} \quad (20b)$$

Next, in case where there exists a target candidate data set at the last observation (k−1), the correlation determination section 305 determines, under the control of the signal processing control part 300, whether the predicted distance R1 (k−1)[p], the predicted relative speed V1 (k−1)[p] and the prediction distance calculation formula E1 (k−1)[p] existing in a p-th target candidate data set TCDS (k−1)[p] as well as the distance Ro (k) [q], the relative speed Vo (k)[q] and the distance calculation formula Eo (k)[q] at the current observation k satisfy the conditions represented by the following expressions (21) through (23)(step S6)

$$E1(k)[p] = Eo(k-1)[q] \quad (21)$$

$$|Ro(k)[q] - R1(k-1)[p]| \leq \Delta r \quad (22)$$

$$|Vo(k)[q] - V1(k-1)[p]| \leq \Delta v \quad (23)$$

where Δr represents a preset distance difference tolerance; Δv represents a preset speed difference tolerance, these tolerances being threshold values, respectively, for condition determination; p ranges from 1 to N inclusive; and q ranges from 1 to N inclusive. Here, note that it is assumed that the determination processing in step S6 is executed for each value of p and q.

If the result at the current observation correlates to the predicted result at the last observation, and it is determined in step S6 that the above conditional expressions (21) through (23) are satisfied (that is, YES), the detection determination flag D (k)[q] in the target candidate data set TCDS (k)[q] is set to 1, and the calculation result (the distance R, the relative speed V) at the current observation is output (step S7), and then the control flow shifts to step S8. On the other hand, if the result at the current observation does not correlate to the predicted result at the last observation, and it is determined in step S6 that the above conditional expressions (21) through (23) are not satisfied (that is, NO), D (k)[q] is set to zero and the control flow immediately shifts to step S8.

If it is determined in step S7 with reference to the value of the detection determination flag D (k)[q] for the target candidate data set TCDS (k)(q=from 1 to N inclusive) that D (k)[q] is equal to 1, the target selection section 306 assumes that an object detected is the target 100, and outputs the distance Ro (k)[q] and the relative speed Vo (k)[q] under the control of the signal processing control part 300. If, however, it is determined as D (k)[q]=0, nothing is output.

Finally, the signal processing control part 300 determines whether the processing at the current observation has been terminated (step S8), and if it is determined that the processing at the current observation has been terminated (that is, YES), it is notified to the control part 101 that the processing at the current observation has been terminated. Upon receipt of this, the control part 101 determines the termination of the operation, and terminates the processing operation of FIG. 4.

On the other hand, if it is determined in step S8 that the processing at the current observation has not been terminated (that is, NO), a return is carried out to step S1 where the following observation is started and the above-mentioned steps S1 through S8 are repeated.

As described above, according to the embodiment of the present invention, in order to detect a target 100 in the form of an object to be detected so as to measure the distance R and the relative speed V to the target 100 by observing a beat signal c that is generated by mixing a transmitted signal W1 and a received signal W2 which are frequency modulated and each of which comprises an up modulation period Tu and a down modulation period Td, provision is made for the distance and speed calculation section 303, the prediction section 304, the correlation determination section 305, and the target selection section 306.

The distance and speed calculation section 303 calculates, as candidates for one target 100 at the current observation, distances R and relative speeds V with respect to the one target 100 by using a plurality of formulae. The prediction section 304 predicts, from the distances R and the relative speeds V calculated at the last observation, a distance calculation formula at an observation immediately after that (i.e., at the current time point), and obtains a distance calculation formula at the following observation from the distances and the relative speeds calculated at the current observation. Also, the correlation determination section 305 determines whether the distance calculation formula at the current observation currently obtained is equal or identical to the predicted distance calculation formula at the current observation predicted from the last observation, and the target selection section 306 selects only that result at the current observation in which the distance R is calculated according to an expression equal to the distance calculation formula predicted at the last observation. Accordingly, it is possible to accurately detect the target 100 without causing any confusion between the distance R and the relative speed V regardless of the magnitude correlation between the distance R and the relative speed V.

In addition, by using, as candidates for one target 100 at the last observation, the beat frequency fU observed in the up modulation period Tu, the beat frequency fD observed in the down modulation period Td, the conversion factor Kr for conversion from distance to frequency, and the conversion factor Kv for conversion from speed to frequency, the distances R and the relative speeds V are calculated according to two kinds of formulae including a first formula (comprising the above expressions (1) and (2)) and a second formula (comprising the above expressions (7), (8a) and (8b)), whereby the target 100 can be detected accurately without causing any confusion between the distances R and the relative speeds V regardless of the magnitude correlation between the distances R and the relative speeds V.

Moreover, by using the current distance difference tolerance $\Delta r$ and the current speed difference tolerance $\Delta v$ as threshold values and the above-mentioned three conditional expressions (21) through (23) for the predicted distance R1 (k−1), the predicted relative speed V1 (k−1) and the prediction distance calculation formula E1 (k−1) at the last observation (k−1) as well as the distance Ro (k), the relative speed Vo (k) and the distance calculation formula Eo (k) at the current observation k, the correlation determination section 305 determines whether the result at the current observation currently obtained is equal to the result at the current observation predicted at the last observation (i.e., whether the distance calculation formula Eo (k) at the current observation k is equal to the prediction distance calculation formula E1 (k−1)), whereby, it is possible to accurately detect the target 100 without causing any confusion between the distances R and the relative speeds V regardless of the magnitude correlation between the distances R and the relative speeds V.

Further, in accordance with a radar signal processing method according to the embodiment of the present invention, distances R and relative speeds V with respect to one target 100 are calculated as candidates for one target 100 at the current observation by using a plurality of formulae (step S4), and a distance calculation formula at an observation immediately after that (i.e., at the current time point) is predicted from the distances R and the relative speeds V calculated at the last observation (step S5). Then, it is determined whether the distance calculation formula at the current observation currently obtained is equal to the predicted distance calculation formula at the current observation predicted from the last observation (step S6), and only that result at the current observation is selected and output in which a distance R is calculated according to an expression equal to the distance calculation formula predicted at the last observation (step S7). Accordingly, it is possible to accurately detect the target 100 without causing any confusion between the distances R and the relative speeds V regardless of the magnitude correlation between the distances R and the relative speeds V.

Furthermore, the distances R and the relative speeds V are calculated as candidates for one target 100 at the last observation by using two kinds of formulae, and it is determined according to the three conditional expressions (21) through (23) whether the result at the current observation currently obtained is equal to the result at the current observation predicted by the last observation, whereby it is possible to accurately detect the target 100 without causing any confusion between the distances R and the relative speeds V regardless of the magnitude correlation between the distances R and the relative speeds V.

While the invention has been described in terms of preferred embodiments, those skilled in the art will recognize that the invention can be practiced with modifications within the spirit and scope of the appended claims.

What is claimed is:

1. A radar apparatus in which a transmission wave based on a frequency modulated transmitted signal comprising an up modulation period and a down modulation period is irradiated onto a target, and a reflected wave from said target is received as a received signal, so that said target is detected by observing a beat signal generated by mixing said transmitted signal and said received signal, thereby measuring a distance or a relative speed to said target, said apparatus comprising:

a distance and speed calculation section that calculates, as candidates for one target at the current observation, distances or relative speeds with respect to said one target by using a plurality of formulae;

an prediction section that obtains an predicted distance calculation formula at the following observation from said distances or relative speeds calculated at the current observation;

a correlation determination section that determines whether said distance calculation formula at the current observation is equal to said predicted distance calculation formula at the current observation predicted from the last observation; and a target selection section that outputs the calculation result of said distance and speed calculation section only when said prediction distance calculation formula at the current observation is equal to said predicted distance calculation formula predicted from the last observation.

2. The radar apparatus as set forth in claim 1, wherein said distance and speed calculation section calculates the distances R and the relative speeds V of said target according to a first formula comprising the following expressions (1) and (2) and a second formula comprising the following expressions (3) through (5) by using a beat frequency fU observed in the up modulation period, a beat frequency fD observed in the down modulation period, a conversion factor Kr for conversion from distance to frequency, and a conversion factor Kv for conversion from speed to frequency $$R=(fU+fD)/(2\times Kr) \qquad (1)$$

$$V=(fU-fD)/(2\times Kv) \qquad (2)$$

$$R=|fU-fD|/(2\times Kr) \qquad (3)$$

$$V=(fU+fD)/(2\times Kv)(\text{in case of } fU>fD) \qquad (4)$$

$$V=-(fU+fD)/(2\times Kv) \text{ (in case of } fU<fD) \qquad (5).$$

3. The radar apparatus as set forth in claim 1, wherein by using a current distance difference tolerance $\Delta r$ and a current speed difference tolerance $\Delta v$ as threshold values and the following conditional expressions (6) through (8) for an predicted distance R1 (k−1), an predicted relative speed V1 (k−1) and an prediction distance calculation formula E1 (k−1) at said last observation (k−1) as well as a distance Ro (k), a relative speed Vo (k) and a distance calculation formula Eo (k) at said current observation k, said correlation determination section determines whether said distance calculation formula Eo (k) at the current observation k is equal to said predicted distance calculation formula E1 (k−1)

$$E1(k)[p]=Eo(k-1)[q] \qquad (6)$$

$$|Ro(k)[q]-R1(k-1)[p]|\leq \Delta r \qquad (7)$$

$$|Vo(k)[q]-V1(k-1)[p]|\leq \Delta v \qquad (8).$$

4. A radar signal processing method for a radar apparatus in which a frequency modulated transmitted signal comprising an up modulation period and a down modulation period is irradiated onto a target, and a reflected wave from said target is received as a received signal, so that said target is detected by observing a beat signal generated by mixing said transmitted signal and said received signal, thereby measuring a distance or a relative speed to said target, said method comprising:

a first step of calculating, as candidates for one target at a current observation, distances or relative speeds with respect to said one target by using a plurality of formulae;

a second step of obtaining an predicted distance calculation formula at the following observation from said distances or relative speeds calculated at the current observation;

a third step of determining whether said distance calculation formula at the current observation is equal to said predicted distance calculation formula at the current observation predicted from the last observation; and a fourth step of outputting the calculation result obtained in said first step only when said prediction distance calculation formula at the current observation is equal to said predicted distance calculation formula predicted from the last observation.

5. The radar signal processing method for a radar apparatus as set forth in claim 4, wherein in said first step, the distances R and the relative speeds V of said target are calculated according to a first formula comprising the following expressions (1) and (2) and a second formula comprising the following expressions (3) through (5) by using a beat frequency fU observed in the up modulation period, a beat frequency fD observed in the down modulation period, a conversion factor Kr for conversion from distance to frequency, and a conversion factor Kv for conversion from speed to frequency $$R=(fU+fD)/(2\times Kr) \qquad (1)$$

$$V=(fU-fD)/(2\times Kv) \qquad (2)$$

$$R=|fU-fD|/(2\times Kr) \qquad (3)$$

$$V=(fU+fD)/(2\times Kv)(\text{in case of } fU>fD) \qquad (4)$$

$$V=-(fU+fD)/(2\times Kv)(\text{in case of } fU<fD) \qquad (5).$$

6. The radar signal processing method for a radar apparatus as set forth in claim 4, wherein in said third step, by using a current distance difference tolerance $\Delta r$ and a current speed difference tolerance $\Delta v$ as threshold values and the following conditional expressions (6) through (8) for an predicted distance R1 (k−1), an predicted relative speed V1 (k−1) and an prediction distance calculation formula E1 (k−1) at said last observation (k−1) as well as a distance Ro (k), a relative speed Vo (k) and a distance calculation formula Eo (k) at said current observation k, a determination is made as to whether said distance calculation formula Eo (k) at the current observation k is equal to said predicted distance calculation formula E1 (k−1)

$$E1(k)[p]=Eo(k-1)[q] \qquad (6)$$

$$|Ro(k)[q]-R1(k-1)[p]|\leq \Delta r \qquad (7)$$

$$|Vo(k)[q]-V1(k-1)[p]|\leq \Delta v \qquad (8).$$

* * * * *